United States Patent
Gimblet et al.

(10) Patent No.: US 6,501,888 B2
(45) Date of Patent: Dec. 31, 2002

(54) FIBER OPTIC CABLES WITH STRENGTH MEMBERS AND AN APPARATUS FOR MAKING THE SAME

(75) Inventors: Michael J. Gimblet, Hickory, NC (US); Larry Field, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/893,378

(22) Filed: Jun. 27, 2001

(65) Prior Publication Data

US 2001/0036345 A1 Nov. 1, 2001

Related U.S. Application Data

(63) Continuation-in-part of application No. 09/397,175, filed on Sep. 16, 1999, now abandoned.

(51) Int. Cl.[7] .................................................. G02B 6/44
(52) U.S. Cl. ........................ 385/113; 385/109; 385/112
(58) Field of Search ................................. 385/112, 109, 385/113, 114

(56) References Cited

U.S. PATENT DOCUMENTS

| | | | | |
|---|---|---|---|---|
| 4,172,106 A | * | 10/1979 | Lewis ........................ 385/109 |
| 4,359,598 A | | 11/1982 | Dey et al. ................. 174/40 R |
| 4,401,361 A | | 8/1983 | Slaughter ................. 350/96.23 |
| 4,420,220 A | * | 12/1983 | Dean ........................... 385/113 |
| 4,729,628 A | | 3/1988 | Kraft et al. .............. 350/96.23 |
| 4,844,575 A | * | 7/1989 | Kinard ........................ 385/113 |
| 5,155,304 A | | 10/1992 | Gossett et al. ........... 174/117 R |
| 5,384,880 A | | 1/1995 | Keller ......................... 385/109 |
| 5,448,670 A | * | 9/1995 | Blew ........................... 385/112 |
| 5,469,523 A | * | 11/1995 | Blew et al. .................. 385/101 |
| 5,642,452 A | | 6/1997 | Gravely et al. ............. 385/113 |
| 5,651,081 A | | 7/1997 | Blew et al. .................. 385/101 |
| 6,101,305 A | * | 8/2000 | Wagman ...................... 385/113 |

FOREIGN PATENT DOCUMENTS

| | | | |
|---|---|---|---|
| DE | 19652762 A | 8/1998 | ............ C08J/3/075 |
| EP | 0629889 A1 | 12/1994 | ............ G02B/6/44 |
| FR | 2497964 A | 7/1982 | ............ G02B/5/16 |
| JP | 8-304675 | 11/1996 | ............ G02B/6/44 |
| JP | 08-304675 | * 11/1996 | |

OTHER PUBLICATIONS

Patent Abstract of Japan; 08304675A; Nov. 22, 1996.
Patent Abstract of Japan; 58011907; Jan. 22, 1983.

* cited by examiner

*Primary Examiner*—Cassandra Spyrou
*Assistant Examiner*—Leo Boutsikaris
(74) *Attorney, Agent, or Firm*—Timothy J. Aberle

(57) ABSTRACT

A fiber optic cable with at least one optical transmission component having a nominal radius, and at least two strength components, at least one of the strength components being generally adjacent to the optical transmission component. At least one of the strength components having a nominal radius that is less than the nominal radius of the optical transmission component. A cable jacket surrounds the optical transmission component and the strength components. The optical transmission component being generally disposed adjacent generally flat surfaces of the cable jacket. The cable can be made by an extrusion tooling apparatus with a tip and a die, the extrusion tooling apparatus being operative to extrude jacketing material about the strength components and the optical transmission component. The tip has an orifice defined within the end of the tip for receiving the strength and optical transmission components therein. The tip further includes at least two generally flat and generally parallel surfaces on opposite sides of said tip, and arcuate sections that generally complement the shape of the strength components.

20 Claims, 2 Drawing Sheets

FIBER OPTIC CABLES WITH STRENGTH MEMBERS AND AN APPARATUS FOR MAKING THE SAME

RELATED APPLICATIONS

The present invention is a Continuation-in-Part of U.S. Ser. No. 09/397,175 filed Sep. 16, 1999 now abandoned.

FIELD OF INVENTION

The present invention relates to fiber optic cables that include at least one optical transmission component and at least one strength component.

BACKGROUND OF THE INVENTION

Fiber optic cables include at least one optical fiber that can transmit data, computer, and/or telecommunication information. Conventional cable designs, however, can have unacceptable optical performance characteristics, and/or can require undesirable structural features that make optical fiber access difficult. In addition, conventional cables can be difficult to route through cable passageways, and/or can make the cable expensive to produce.

Cable designs that define a backdrop for the present inventions can be, for example, difficult to route through cable passageways and/or can be expensive to produce. U.S. Pat. No. 5,155,304 discloses an aerial service wire that includes a PVC jacket having a generally block-shaped cross section. Enclosed by the jacket are two groups of strength components, each of which includes a plurality of filaments that are impregnated with a plastic material. Moreover, conventional aerial fiber optic cables can be too large for some applications. For example, EP-A1-0629889 discloses an aerial cable requiring an optical cable central part with two metallic strain relief elements that are placed diametrically opposite to each other and adjacent the optical cable part. The strain relief elements are connected to the cable part by means of a jacket that includes web-like extensions between the optical cable part and the strain relief elements. In addition, optical cables of the single fiber type may not provide adequate data transmission capacity. For example, JP-A-8304675 discloses a single optical fiber disposed between two glass fibers having respective outside diameters that are larger than the outside diameter of the optical fiber. Moreover, the two relatively large glass fibers can make the cable stiff and difficult to route through cable passageways.

SUMMARY OF THE INVENTION

The present invention is directed to a fiber optic cable having at least one optical transmission component with a nominal radius, and at least two strength components, at least one of the strength components being generally adjacent to the optical transmission component. At least one of the strength components can have a nominal radius that is less than the nominal radius of the optical transmission component. The cable has a cable jacket surrounding the optical transmission component and the strength components. The optical transmission component being generally disposed adjacent generally flat surfaces on the cable jacket.

The present invention is also directed to a fiber optic cable with at least one optical transmission component, and at least two strength components, the strength components being disposed adjacent the optical transmission component. The cable has a jacket surrounding the optical transmission component and the strength components. The cable jacket being about 10 mm wide or less and about 5 mm in height or less.

The present invention also includes an extrusion tooling apparatus comprising a tip and a die, the extrusion tooling apparatus being operative to extrude jacketing compound about strength components and at least one optical transmission component for making a generally flat cable. The extrusion tooling apparatus includes an inlet port for receiving a jacketing compound under suitable temperature and pressure conditions, channels for channeling the jacketing compound from the inlet port toward the tip and the die. The tip has an orifice defined within an end portion of the tip for receiving the strength and optical transmission components therein, the tip includes at least two generally flat and generally parallel surfaces on opposite sides of the tip. The tip further includes arcuate sections. The arcuate sections generally complement said shape of said strength components. The die includes a die orifice for shaping the jacketing compound as it exits said extrusion-tooling apparatus.

BRIEF DESCRIPTION OF THE DRAWING FIGURES

DETAILED DESCRIPTION OF THE INVENTION

Figure 1:
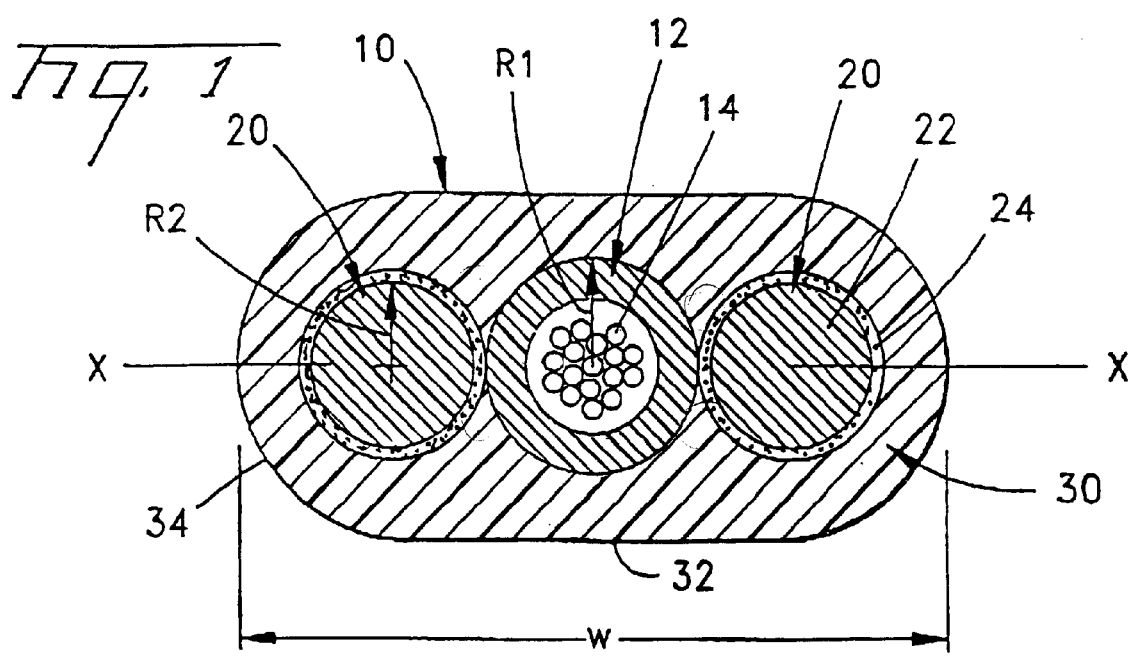
FIG. 1 is a cross sectional view of a fiber optic cable according to the present invention.
Figure 2:
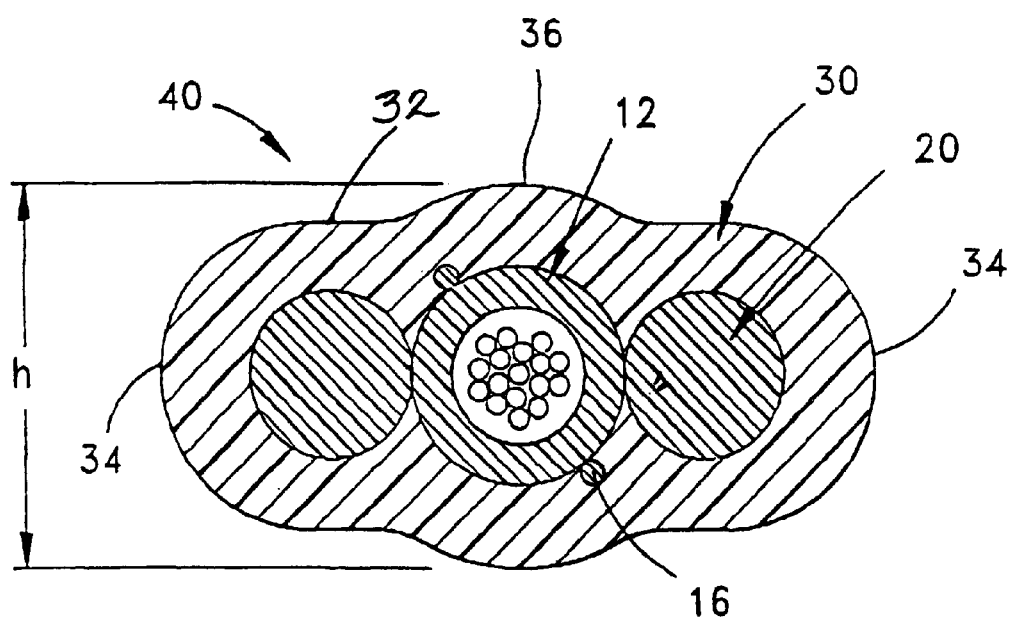
FIG. 2 is a cross sectional view of a fiber optic cable according to another embodiment of the present invention.

With reference to FIGS. 1–2, fiber optic cables 10 and 40 according to the present invention will be described. Fiber optic cable 10 comprises at least one optical transmission component, for example, a buffer tube 12 having at least one optical fiber 14 loosely received therein. The optical fiber is preferably a single mode fiber, but it can be any type of optical fiber including, for example, a multi-mode or dispersion shifted fiber. Buffer tube 12 preferably comprises a nominal radius R1 of about 1.5 mm, and is preferably formed of polypropylene and blends thereof, but it can be formed of, for example, polyethylene and blends thereof.

In the preferred embodiment, the optical transmission component is disposed between at least two strength components 20. Preferably, strength components 20 are single, unitary rod-like members formed of a dielectric material, for example, glass reinforced plastic. Strength components 20 comprise a nominal radius R2 (FIG. 1), and preferably comprise a coating 24 adhered to respective outer surfaces thereof. Coating 24 comprises a water swellable powder in a plastic matrix. Nominal radius R2 preferably is, for example, about 0.85 mm or 1.275 mm, but it is most preferably about 1.025 mm. In the preferred embodiment, the nominal radius R1 of optical transmission component 12 is greater than the nominal radius R2 of strength members 20.

Optical transmission component 12 and strength components 20 are preferably surrounded by a cable jacket 30. In one embodiment, fiber optic cable 10 is a generally flat cable. Jacket 30 of fiber optic cable 10 (FIG. 1) comprises generally arcuate sections 34 and generally flat-sided sections 32. Jacket 30 of fiber optic cable 40 (FIG. 2) comprises generally arcuate sections 34 and generally arcuate medial sections 36. Medial sections 36 define extensions of jacket 30 that complement the shape of optical transmission component 12. In the embodiment of FIG. 2, the profile of jacket 30 preferably uses less jacketing material than the embodiment of FIG. 1 and the embodiment of FIG. 2 can therefore be less expensive. In the preferred embodiment, the width w of fiber optic cable 10 or 40 is about 9.0 mm to about 10 mm (FIG. 1), and the height h of fiber optic cable 10 or 40 is about 4.0 mm to about 5.0 mm (FIG. 2).

In the preferred embodiment, strength components 20 are located generally adjacent to optical transmission component 12. At least one but preferably both of strength members 20 are generally in contact with at least a portion of optical transmission component 12. In other words, in the most preferred embodiment, there is at least general contact between optical transmission component 12 and both strength components 20. Alternatively, jacketing material having a thickness of less than about 1.0 mm can be interposed between the optical transmission component and at least one strength component. Additionally, the respective centers of strength components 20 and optical transmission component 12 are preferably generally aligned in a preferential bend axis X—X (FIG. 1).

Manufacture

Figure 3:
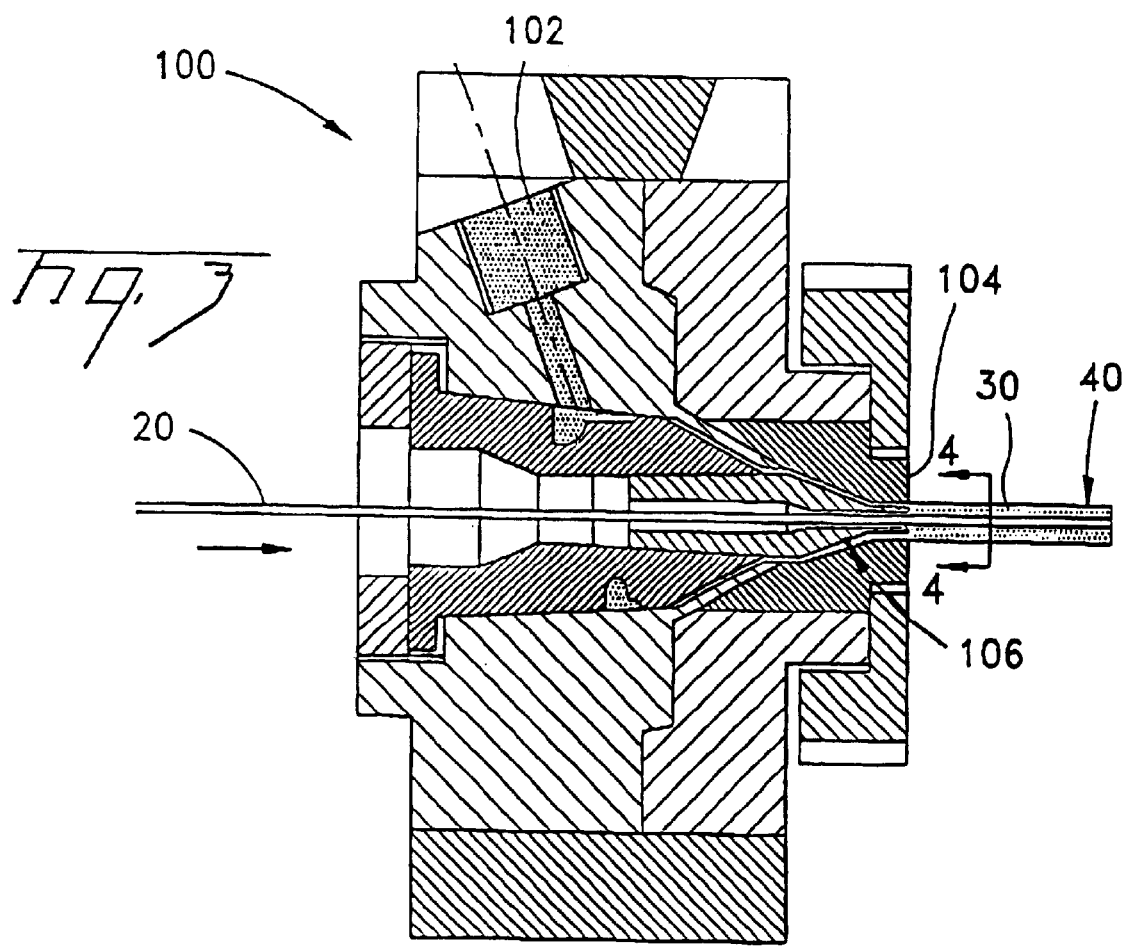
FIG. 3 is a schematic, cross sectional view of an extrusion tool for manufacturing fiber optic cables according to the present invention.
Figure 4:
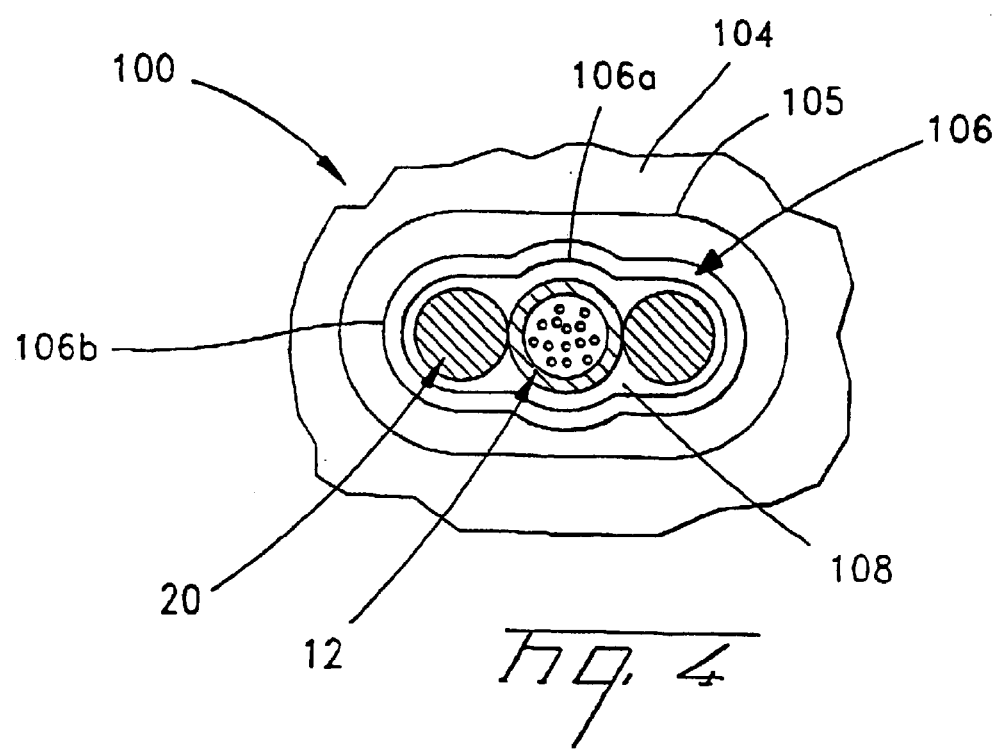
FIG. 4 is an enlarged view of the exit face of the extrusion tooling taken at line 4—4 of FIG. 3.

The preferred mode of manufacture of cables according to the present invention can be accomplished by operation of exemplary extrusion tooling 100 (FIGS. 3–4). Extrusion tooling 100 is operative to extrude jacketing material 30 about strength components 20 and at least one optical transmission component 12 (FIG. 4). As components 12,20 are fed into extrusion tooling 100 (FIG. 3), a jacketing compound, e.g., polyethylene, is supplied under suitable temperature and pressure conditions to an inlet port 102. The jacketing compound is channeled toward a die 104 and a tip 106. The jacketing compound coats components 12, 20 thereby forming jacket 30 therearound.

FIG. 4 schematically shows an exit face of extrusion tooling 100 with the jacketing compound or melt removed for illustration purposes. In a preferred embodiment of the present invention, tip 106 includes an orifice 108 defined within the end portion of tip 106 for receiving components 12, 20 therein. More particularly, tip 106 includes arcuate sections 106a and 106b that complement the respective cross sectional shapes of components 12, 20. Arcuate sections 106a comprise relatively large radii that complement the shape of optical transmission component 12, and arcuate sections 20 have relatively smaller respective radii that complement the shapes of strength components 20. Die 104 includes a die orifice 105 that defines the outer surface of jacket 30. Pressure extrusion of the melt results in the formation of a jacket 30 with generally flat sides 32, as exemplified by the embodiment of FIG. 1. Alternatively, tubing-on plus vacuum drawing the melt during extrusion results in a jacket 30 with arcuate sections 36, as exemplified by the embodiment of FIG. 2. In the pressure extrusion process, the end of tip 106 is preferably recessed from the face of die 104. In the tubing-on plus vacuum draw down process, the end of tip 106 is preferably generally flush with the face of die 104. Preferably, the die orifice 105 used for the pressure extrusion process is relatively smaller than the die orifice 105 used for the tube-on plus vacuum draw down process.

Operation

An illustrative transmission component access procedure includes using a knife to shave off jacket 30. The buffer tube is then removed with a ring-cutting tool, and the optical fibers can then be exposed for connectorization or splicing procedures. When installed, cables made according to the present invention should have a long service life, as the cables meet most if not all of TELLCORDIA GR-20 and/or ICEA 640 mechanical and environmental requirements.

The present invention has been described with reference to the foregoing exemplary embodiments, which embodiments are intended to be illustrative of the present inventive concepts rather than limiting. Persons of ordinary skill in the art will appreciate that variations and modifications of the foregoing embodiments may be made without departing from the scope of the appended claims. For example, optical transmission component 12 may comprise at least one tight buffered fiber and/or a bundle of optical fibers. As an alternative to glass reinforced plastic, strength components 20 can be aramid fibers impregnated with a suitable plastic material. Additionally, more than two strength members can be included in cables 10,40. Although a circular cross section for strength components is preferred, other cross sectional shapes may be used as well. The concepts described herein can be applied to many cable designs, for example, self-supporting, buried, indoor, and indoor/outdoor cable applications. Flame retardant jacket materials can be selected to achieve plenum, riser, or LSZH flame ratings. Super absorbent polymers or blocking substances, e.g., thixotropic greases, may be included in any interstice of a cable. For example, at least one water-swellable tape or yarn 16 (FIG. 2) can be disposed adjacent to the optical transmission component. Preferably two water-swellable yarns 16 are counter-helically stranded about tube 12. Cables according to the present invention can include at least one electrical conductor for power or data transmission, for example, at least one coaxial or single wire, or a twisted pair of wires. Ripcords and/or an armor layer can be added adjacent tube 12.

Accordingly, what is claimed is:

1. A fiber optic cable, comprising: at least one optical transmission component having a nominal radius;

at least two strength components, at least one of said strength components being generally adjacent to said optical transmission component, and at least one of said strength components having a nominal radius that is less than said nominal radius of said optical transmission component; and a cable jacket, said cable jacket having a first flat-sided surface and a second flat-sided surface, said first and second flat-sided surfaces being generally parallel across a majority of a width of the fiber optic cable, said cable jacket surrounding said at least one optical transmission component and said at least two strength components.

2. The fiber optical cable of claim 1, said optical transmission component comprising a buffer tube with at least one optical fiber therein.

3. The fiber optical cable of claim 1, each of said strength components being generally in contact with said optical transmission component.

4. The fiber optical cable of claim 1, at least one of said strength components comprising a water-swellable coating.

5. The fiber optical cable of claim 1, at least one of said strength components being formed of a dielectric material.

6. The fiber optic cable of claim 1, at least one of said strength components comprising a generally circular cross section.

7. The fiber optic cable of claim 1, said at least two strength components comprising rod-like members.

8. The fiber optical cable of claim 1, said at least two strength components and said at least one optical transmission component having respective centers that are generally aligned in a preferential bend axis.

9. The fiber optic cable of claim 1, at least one water-swellable yarn being helically stranded about said optical transmission component.

10. The fiber optic cable of claim 1, said nominal radius of said at least one strength component being about 85% of said nominal radius of said at least one optical transmission component.

11. The fiber optic cable of claim 1, said nominal radius of said at least one strength component is about 55% to about 85% of said nominal radius of said at least one optical transmission component.

12. A fiber optic cable, comprising.
  at least one optical transmission component;
  at least two strength components, said strength components being disposed adjacent said optical transmission component; and
  a cable jacket, said cable jacket having a first major flat-sided surface and a second major flat-sided surface, said first major surface being generally parallel to said second major surface, said cable jacket surrounding said at least one optical transmission component and said at least two strength components, said cable jacket being about 10 mm wide or less and about 5 mm in height or less.

13. The fiber optic cable of claim 12, at least one of said strength components having a nominal radius of about 1.275 mm or less.

14. The fiber optic cable of claim 12, said optical transmission component comprising a nominal radius of about 1.5 mm.

15. The fiber optic cable of claim 12, said strength components having a nominal radii being about 85% of a nominal radius of said at least one optical transmission component.

16. The fiber optic cable of claim 12, said strength components having a nominal radii being about 55% to about 85% of a nominal radius of said at least one optical transmission component.

17. An extrusion tooling apparatus comprising a tip and a die, said extrusion tooling apparatus being operative to extrude jacketing compound about strength components and at least one optical transmission component for making a generally flat cable, at least one of said strength components having a nominal radius that is less than said nominal radius of said optical transmission component, said extrusion tooling apparatus comprising:
  an inlet port for receiving a jacketing compound under suitable temperature and pressure conditions;
  channels for channeling said jacketing compound from said inlet port toward said tip and said die;
  said tip comprising an orifice defined within an end portion of said tip for receiving said strength and optical transmission components therein, said tip comprising at least two flat-sided surfaces that are generally parallel on opposite sides of said tip for a majority of a tip width, said tip further comprising arcuate sections, said arcuate sections generally complement said shape of said strength components; and
  said die comprising a die orifice for shaping said jacketing compound as it exits said extrusion-tooling apparatus.

18. The fiber optic cable of claim 12, further comprising a water-swellable material, said water-swellable material having a portion disposed between said at least one optical component and one of at. least two strength components.

19. The fiber optic cable of claim 18, said water-swellable material being selected from the group of a yarn and a tape.

20. The fiber optic cable of claim 18, said water-swellable material being a coating on at least one of said strength components.

* * * * *